(12) United States Patent
Watson et al.

(10) Patent No.: US 6,320,287 B1
(45) Date of Patent: *Nov. 20, 2001

(54) ELECTRIC MOTOR

(75) Inventors: Stephen Richard Watson, South Petherton; Malcolm Philip Wilson, Crewkerne, both of (GB)

(73) Assignee: Normalair-Garret (Holdings) Limited, Somerset (GB)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/303,346

(22) Filed: Mar. 30, 1999

(30) Foreign Application Priority Data

May 2, 1998 (GB) .................................................. 9809418

(51) Int. Cl.$^7$ ............................................................ H02K 5/24
(52) U.S. Cl. .............................. 310/51; 310/254; 310/91
(58) Field of Search ............................... 310/51, 254, 91, 310/217, 218

(56) References Cited

U.S. PATENT DOCUMENTS

| | | | | |
|---|---|---|---|---|
| 1,668,889 | * | 10/1928 | Spreen ................................. | 310/51 |
| 3,465,182 | * | 9/1969 | Church et al. ....................... | 310/51 |
| 4,082,974 | * | 4/1978 | Yamamoto et al. ................. | 310/179 |
| 4,173,724 | * | 11/1979 | Mujsil ................................. | 310/258 |
| 4,990,809 | * | 2/1991 | Artus et al. ......................... | 310/254 |
| 5,142,179 | * | 8/1992 | Nakamura et al. .................. | 310/254 |
| 5,521,447 | * | 5/1996 | Bertolini et al. .................... | 310/51 |

* cited by examiner

Primary Examiner—Joseph Waks
(74) Attorney, Agent, or Firm—Marshall, O'Toole, Gerstein, Murray & Borun

(57) ABSTRACT

A combination of a rotor and a stator assembly, the stator assembly having a first part and a second part, the first and second parts being generally concentric, the rotor being rotatably mounted in the stator assembly, the combination further including a plurality of elongate resilient damping elements which extend generally in an axial direction, and being located between and spacing apart the first part and the second part of the stator assembly.

13 Claims, 1 Drawing Sheet

ELECTRIC MOTOR

BACKGROUND TO THE INVENTION

The present invention relates to a combination of a rotor and stator assembly, such as an electric motor or generator. More particularly but not exclusively the invention relates to a switched reluctance motor or generator.

All types of electric motors produce vibration when operating, and hence noise. In some applications the noise produced may be acceptable but in other applications it may be a significant problem. For example when a switched reluctance motor is used to power an air cycle air conditioning unit for a railway carriage, the noise is typically transmitted through the fixings into the railway carriage producing an unacceptable level of noise for the occupants of the carriage.

DESCRIPTION OF THE PRIOR ART

Efforts have been made to reduce the transmission of the noise into the carriage by the use of soundproof lagging, but has been found not to be effective on its own, since in some applications there is insufficient space for sufficient lagging to provide effective noise suppression. Also, noise can still travel along air ducting and other pipework.

An alternative approach is to try to reduce the vibrations generated by the motor, rather than to prevent the transmission of noise. To do so it is necessary to understand the processes which lead to the vibration. It is believed the following explains how the vibrations arise in a motor.

A rotor comprises a plurality of rotor pole portions which project outwardly in a radial direction and extend in an axial direction. The rotor is disposed within a stator assembly which comprises a plurality of stator pole portions which project inwardly in a radial direction and extend axially. During use of the motor the rotor rotates and each of the rotor pole portions moves in and out of alignment with each of the stator pole portions, although a clearance is always maintained between the rotor and stator pole portions. Coils are wound on each of the stator pole portions, with coils on opposing pairs connected in series to each other. Thus, when current is supplied to the coils a magnetic flux is generated between each pair of stator pole portions. This results in a magnetic attractive force between the rotor pole portions and stator pole portions as they approach one another, which can be controlled by switching the supply current in accordance with the rotational orientation of the rotor.

In a switched reluctance motor the current supplied to one, or more, pairs of stator pole portions is switched, or pulsed, on and off. The current is generally switched on as a pair of rotor pole portions approaches alignment with a pair of stator pole portions, but is switched off again just before alignment is achieved. Thus the magnetic attractive force is increased as the rotor and stator pole portions approach alignment, but disappears just before alignment is achieved. This sequence produces the motoring torque desired.

However, the one, or more, stator pole portions which are switched as described above are, as a result of the magnetic attractive force, attracted to the rotor pole portions producing inward strain within the stator assembly and the housing. When the current is switched off, and the magnetic attractive force disappears, the inward strain on the stator suddenly ceases and the housing moves back outwardly to its original position. As the switching is periodic, the forces acting on the housing are also period and the housing vibrates.

One known way of reducing the vibration and hence noise, is to increase the external diameter of the housing or of the stator assembly or both, however as this adds weight and size to the motor it is undesirable in many applications, and may also have cost implications.

Another prior art method of addressing this problem in switched reluctance motors is described in UK patent application published under number GB 2 303 745 A. In this case a plurality of stiffening rods pass through portions of the stator and penetrate into end brackets which support the rotor.

Another known approach to this problem in switched reluctance motors uses a semi-active vibration reduction system. Multiple pulses are applied to each phase of the motor at a period which produces anti-phase vibrations in the stator, and hence reduces the total vibrations produced. However, this approach is not suitable for motors with a high operating speed, e.g. in excess of 24,000 rpm, as in such cases there is insufficient time available to apply the correcting signals to the stator pole coils. In addition semi-active systems degrade the optimum efficiency of the motor which in some circumstances, is undesirable.

It is an object of the present invention to provide an improved electric motor which mitigates the above described problems.

SUMMARY OF THE INVENTION

According to a first aspect of the present invention we provide a combination of a rotor and a stator assembly, the stator assembly having a first pail and a second part, the first and second parts being generally concentric, the rotor being rotatably mounted in the stator assembly, the combination further including means located between and spacing apart the first part and the second part of the stator assembly characterised in that the means located between and spacing apart the first part and the second part includes a plurality of elongate resilient damping elements which extend generally in an axial direction.

The invention provides the advantage that the transmission of electromagnetic vibrations generated is reduced without degradation of the motor or generator performance.

Preferably the first part of the stator assembly is of generally circular internal cross-section, the second part of the stator assembly is of generally circular external cross-section, and the resilient damping elements are spaced apart between the first and second parts to maintain a generally annular space therebetween, and wherein the first and second parts and resilient damping elements extend in an axial direction.

Conveniently the first and second parts of the stator assembly provide a plurality of axially extending grooves each of which is adapted to receive one of the plurality of resilient damping elements. For example the first and/or second parts of the stator assembly may have respectively, internal and external surfaces which may comprise a plurality of axially extending grooves each of which is adapted to receive one of the plurality of resilient damping elements.

Preferably the resilient damping means is held in compression between the first and second parts of the stator assembly such that it is maintained in position, e.g. in grooves which retain the resilient damping means.

Alternatively, or in addition, the combination may include retaining means to retain the resilient damping means in position relative to the first and second parts of the stator assembly. For examples, the retaining means may comprise end plates with recesses to receive the ends of the resilient damping means thus to support the resilient damping means, at their ends.

Preferably the resilient damping elements comprise elongate elements.

Preferably the elongate elements are substantially circular in cross section. Alternatively the elongate elements may be substantially elliptical in cross section, or polygonal in cross section.

Preferably the elongate elements comprise tubes made from metal or fibre reinforced plastics material. The tubes may be filled with a resilient material.

Preferably the combination includes three resilient damping elements.

BRIEF DESCRIPTION OF THE DRAWING

An example of an electric motor according to the present invention will now be described, by way of example only, with reference to the accompanying drawings in which.

DESCRIPTION OF THE PREFERRED EMBODIMENT

Figure 1:
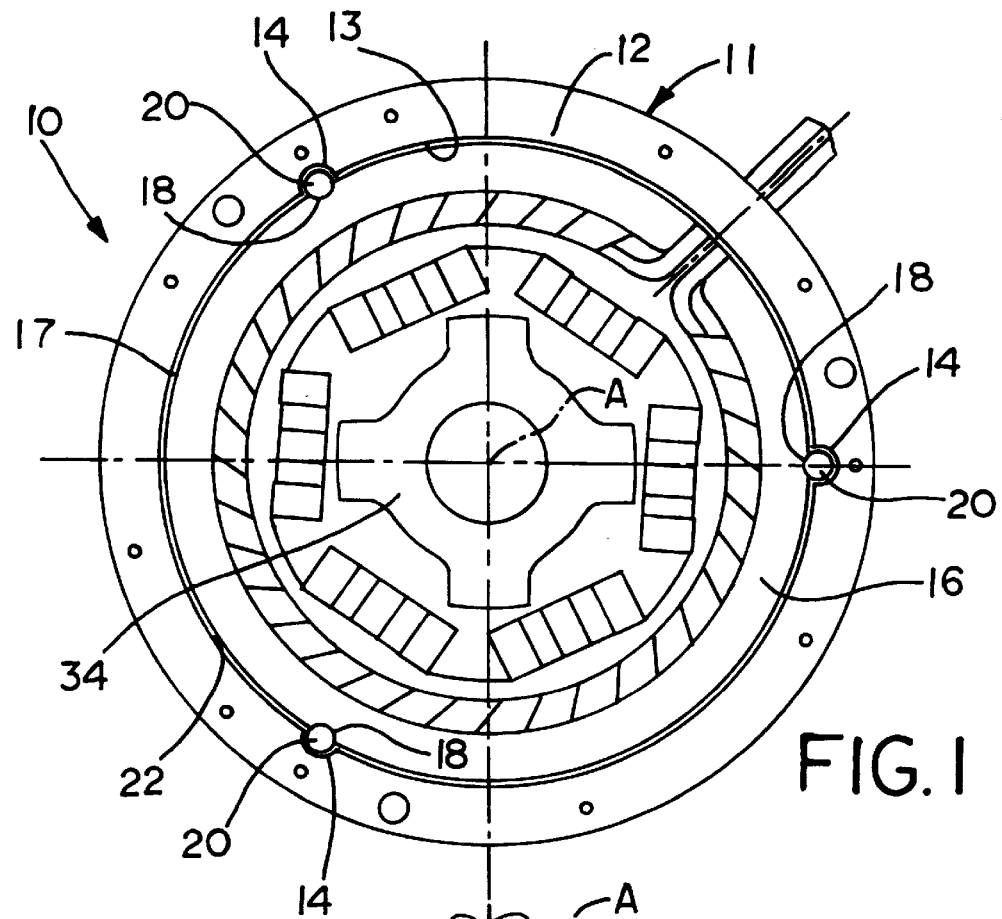
FIG. 1 is a cross sectional view of an electric motor according to the present invention, from which the rotor has been omitted for the sake of clarity.
Figure 2:
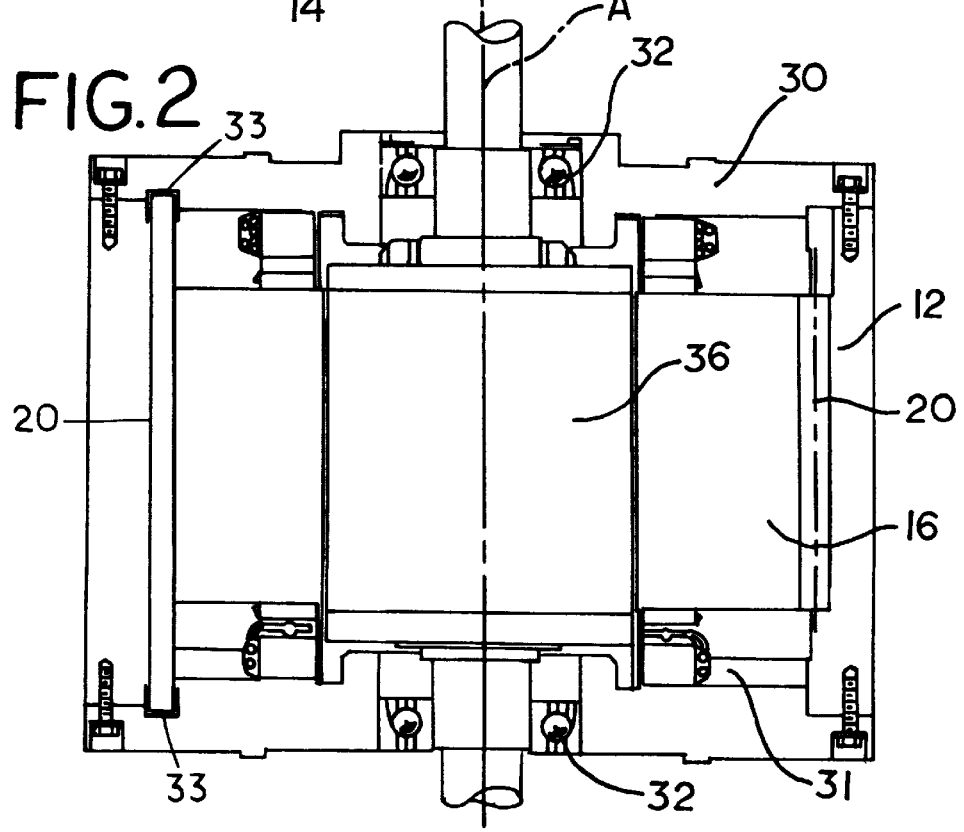
FIG. 2 is a side sectional view of the motor of FIG. 1 with a rotor

Referring to the drawings there is shown an electric motor 10, of the switched reluctance kind. The motor 10 has a stator assembly 11 having a first part or housing 12, and a second part or stator 16. The housing 12 has an internal surface 13 which defines a generally cylindrical chamber with a first radial dimension, and the chamber extends in an axial direction A. The stator 16, has an external surface 17 and is of generally circular cross section, with a second radial dimension smaller than the first radial dimension of the chamber. The external surface 17 of the stator 16 has formed therein three axially extending grooves 18 spaced apart around the circumference, and corresponding grooves 14 are provided in the internal surface 13 of the housing 12. Each pair of grooves 18, 14 provides a channel in which is located an elongate resilient damping element 20. The grooves 18, 14 and the elongate resilient damping elements 20 are dimensioned so as to space apart the housing 12 and stator 16 and maintain a generally annular space 22 therebetween.

The elongate resilient damping elements 20 take the form of, in this embodiment metallic tubes of generally circular cross-section and of substantially the same length as the stator 16. Contact between the tubes 20 and the internal and external surfaces 13, 17 of the housing 12 and stator 16 is tangential point contact, along the lengths of the tubes 20.

The tubes 20 have a spring rate which is determined by their external diameter, their wall thickness and the material from which they are made. The form of the tubes 20 used in any particular motor 10 is selected to provide the appropriate spring rating required to produce the damping effect necessary for that motor. For example, having consideration to the axial lengths of the tubes 20 and the number of tubes 20 used. In a three tube arrangement, in which each tube 20 has an outside diameter of 10 mm and an internal diameter of 9.1 mm, and a length of 100 mm, each tube may have a spring rate of about 10 kN mm$^{-1}$. Each tube 20 may be made of commercially available high tensile steel.

In the examples, the tubes 20 are in compression between the housing 12 and the stator 16 of the stator assembly 11, and are retained in position as a result. The grooves 17, and 13 of the external and internal surface 18, 14 are dimensioned to ensure this. The cross-sections of the tubes 20 may become distorted slightly once the motor 10 is assembled.

In order to assemble the motor 10 in order to achieve compression of the tubes 20, the housing 12 is heated, the stator 16 is cooled, and then the stator 16 is placed within the housing 12 and the tubes 20 inserted between the two, before the whole is allowed to reach ambient temperature. The holding of the tubes 20 in compression results in an inward force on the stator assembly 16 which positions the stator 16 concentrically within the housing 12. This in itself is advantageous as it is known that truly concentric stator/rotor assemblies produce less vibration.

This method of mounting reduces the transmission in use, of electromagnetically induced vibration, i.e. noise, from the stator 16 to the housing 12, and hence of noise out of the motor 10. It also provides the advantage in this embodiment, that the annular space 22 can be used for the passage of cooling fluid, either gas or liquid as appropriate, to provide motor cooling as required.

The motor 10 further comprises end plates 30, 31 which provide bearings 32 for the mounting of a rotor 34 as is well known in the art.

Although in the embodiment described above three resilient damping elements 20 are provided, embodiments according to the invention may comprise differing numbers in excess of three.

Furthermore, whilst in the embodiment described the internal surface 13 of the housing 12 has grooves 14, the internal surface 13 may be smooth. Alternatively both the internal surface 13 of the housing 12 and the external surface 17 of the stator 16 may be smooth. In this case the contact of the tubes 20 on both surfaces 13, 17 will be solely tangential point contact, along the lengths of the tubes 20.

The tubes 20 described above are of generally circular cross-section, but tubes of elliptical, or polygonal (e.g. triangular or rectangular) cross-section may used in their place. The material from which the tubes are made may be metal, or for some applications fibre reinforced plastics material, the fibre reinforcement typically being glass or carbon fibre. The tubes 20 may be filled with a resilient material to tailor the characteristic of the damping achieved, to a particular use. The tubes 20 may comprise an assembly of an outer tube e.g. of metal, and an inner generally concentric tube e.g. of metal, with a tube of e.g. resilient material between the inner and outer tubes.

As described, the tubes 20 in the motor 10 are retained in position simply by being held in compression between the housing 12 and stator 16 between the end plates 30, 31. However, if desired retaining means such as brackets, pins, screws or the like may be used or the tubes may simply be supported at their ends, e.g. in cut-outs 33 provided in the motor end plates 30, 31.

Although the invention has been described with reference to a switched reluctance motor, the invention may be applied to a switched reluctance generator, or to any other kind of motor or generator which has a rotor and a stator assembly.

What is claimed is:

1. A combination of a rotor and a stator assembly, the stator assembly having a first part and a second part, the stator assembly further including a pair of end plates, the first and second parts being generally concentric, the rotor being rotatably mounted in the stator assembly, the combination further including means located between and spacing apart the first part and the second part of the stator assembly to provide a generally annular space therebetween, the means being adapted so that the annular space remains substantially unoccupied, and wherein the means located and spacing apart the first part and the second part includes at least three elongate resilient damping elements each of which extends generally in an axial direction, each of the elongate resilient damping elements having a tubular cross-section, the elongate resilient damping elements being spaced apart between the first and second parts and extending along a length of the stator assembly between the pair of end plates.

2. An electric motor comprising a stator assembly having a first part and a second part, the first and second parts being generally concentric, a rotor rotatably mounted in the stator assembly, and means located between and spacing apart the first part and the second part of the stator assembly, wherein the means located between and spacing apart the first part and the second part includes a plurality of elongate resilient damping elements which extend generally in an axial direction, each of the elongated resilient damping elements being generally tubular, the means further cooperating with the first and second parts to define an annular and substantially unoccupied gap therebetween, each of the elongated resilient damping elements being sized such that a cross-section of each of the elongated resilient damping elements substantially corresponds to a size of the gap.

3. A stator assembly comprising:

a first part having an internal surface;

a second part having an external surface and being adapted to receive a rotor, the first and second parts being concentrically mounted such that the first part internal surface and the second part external surface cooperate to define a substantially unoccupied annular gap therebetween, at least a portion of the annular gap defining a coolant flow path through the stator assembly; and a plurality of elongate resilient damping elements disposed in and spaced about the gap, the elongate resilient damping elements extending between a first end plate of the stator assembly and a second end plate of the stator assembly, the elongate resilient damping elements being received in the first and second end plates and extending between the first and second end plates substantially along a length of the gap.

4. The stator assembly of claim 3, wherein at least one of the first part internal surface and the second part external surface defines a plurality of grooves therein, and further wherein each of the elongate resilient damping elements is tubular, each of the grooves being adapted to receive therein a portion of a corresponding one of the elongate resilient damping elements.

5. A combination of a rotor and a stator assembly, the stator assembly having a first part and a second part, the first and second parts being generally concentric, the rotor being rotatably mounted in the stator assembly, the combination further including means located between and spacing apart the first part and the second part of the stator assembly to provide a generally annular space therebetween and wherein the means located and spacing apart the first part and the second part includes at least three elongate resilient damping elements each of which extends generally in an axial direction, the elongate resilient damping elements being spaced apart between the first and second parts, and further including retaining means for retaining the elongate resilient damping elements in position relative to the first and second parts of the stator assembly, the retaining means including end plates with recesses adapted to receive an end of the elongate resilient damping elements.

6. A combination of a rotor and a stator assembly, the stator assembly having a first part and a second part, the first and second parts being generally concentric, the rotor being rotatably mounted in the stator assembly, the combination further including means located between and spacing apart the first part and the second part of the stator assembly to provide a generally annular space therebetween and wherein the means located and spacing apart the first part and the second part includes at least three elongate resilient damping elements each of which extends generally in an axial direction, the elongate resilient damping elements being spaced apart between the first and second parts, each of the elongate resilient damping elements comprising a tube filled with a resilient material.

7. A combination according to claim 6 wherein the first part of the stator assembly is of generally circular internal cross-section, the second part of the stator assembly is of generally circular external cross-section, and wherein the elongate resilient damping elements extend in an axial direction in the annular space.

8. A combination according to claim 6 wherein the first and second parts of the stator assembly provide a plurality of axially extending channels each of which is adapted to receive one of the plurality of elongate resilient damping elements.

9. A combination according to claim 8 wherein the first and second parts of the stator assembly have respectively internal and external surfaces, at least one of the surfaces having a plurality of axially extending grooves, each of the grooves being adapted to receive one of the plurality of elongate resilient damping elements.

10. A combination according to claim 6 wherein the elongate resilient damping elements are each held in compression between the first and second parts of the stator assembly such that the elongate resilient elements are maintained in position.

11. A combination according claim 6 wherein the elongate resilient damping elements are substantially circular in cross section.

12. A combination according to claim 6 wherein the elongate resilient damping elements are substantially elliptical in cross section.

13. A combination according to claim 6 wherein the elongate resilient damping damping elements are polygonal in cross section.

* * * * *

UNITED STATES PATENT AND TRADEMARK OFFICE
CERTIFICATE OF CORRECTION

PATENT NO.   : 6,320,287 B1  
DATED        : November 20, 2001  
INVENTOR(S)  : Stephen Richard Watson and Malcolm Philip Wilson Page 1 of 1

It is certified that error appears in the above-identified patent and that said Letters Patent is hereby corrected as shown below:

<u>Title page,</u>  
Item [73], correct Assignee to read as follows:  
-- [73] Assignee: Normalair-Garrett (Holdings) Limited, Somerset (GB) --  
Item [22], correct the filing date to read as follows:  
-- [22] Filed: April 30, 1999 --

Signed and Sealed this

Sixth Day of August, 2002

*Attest:*

JAMES E. ROGAN  
*Attesting Officer*      *Director of the United States Patent and Trademark Office*